(12) United States Patent
Parazak et al.

(10) Patent No.: US 9,016,830 B2
(45) Date of Patent: Apr. 28, 2015

(54) INKJET CLEANING UNIT AND METHOD

(75) Inventors: Dennis P. Parazak, Oceanside, CA (US); Dustin W. Blair, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 978 days.

(21) Appl. No.: 12/548,326

(22) Filed: Aug. 26, 2009

(65) Prior Publication Data

US 2009/0315942 A1 Dec. 24, 2009

Related U.S. Application Data (62) Division of application No. 11/077,867, filed on Mar. 10, 2005, now abandoned.

(51) Int. Cl.
*B41J 2/165* (2006.01)
*C09D 11/38* (2014.01)

(52) U.S. Cl.
CPC ............. B41J 2/16552 (2013.01); C09D 11/38 (2013.01)

(58) Field of Classification Search
CPC ...... B41J 2/16552; B41J 2/185; B41J 2/1707; B41J 2/16526; B41J 2/16538
USPC ............................... 347/28, 31, 32, 29, 30, 34
See application file for complete search history.

(56) References Cited

U.S. PATENT DOCUMENTS

| | | | |
|---|---|---|---|
| 5,547,917 A | 8/1996 | Defieuw et al. | |
| 5,905,514 A * | 5/1999 | Rhoads et al. | 347/33 |
| 6,155,667 A * | 12/2000 | Eckard et al. | 347/33 |
| 6,224,186 B1 | 5/2001 | Johnson et al. | |
| 6,436,108 B1 | 8/2002 | Mears | |
| 2002/0142097 A1 | 10/2002 | Giacobbi et al. | |
| 2003/0019395 A1* | 1/2003 | Ma et al. | 106/31.59 |
| 2003/0081047 A1* | 5/2003 | Yearout | 347/28 |
| 2005/0018023 A1 | 1/2005 | Momose et al. | |
| 2006/0001710 A1 | 1/2006 | Lee | |

FOREIGN PATENT DOCUMENTS

| | | | |
|---|---|---|---|
| EP | 1060894 A | 12/2000 | |
| EP | 1138729 A | 10/2001 | |

\* cited by examiner

*Primary Examiner* — Manish S Shah
(74) *Attorney, Agent, or Firm* — Van Cott, Bagley, Cornwall & McCarthy (57) ABSTRACT

An inkjet cleaning unit includes a reservoir housing an inkjet wiping fluid that includes a non-wettable material; and an applicator wick fluidly coupled to the reservoir, in which the applicator wick is configured to transport the inkjet wiping fluid from the reservoir to a surface of an inkjet material dispenser. A method for cleaning an inkjet material dispenser includes applying an inkjet wiping fluid from a reservoir housing the inkjet wiping fluid to a surface of the inkjet material dispenser; in which the inkjet wiping fluid includes a non-wettable material; and
in which an applicator wick is fluidly coupled to the reservoir to transport the inkjet wiping fluid from the reservoir to the surface of the inkjet material dispenser.

16 Claims, 11 Drawing Sheets

INKJET CLEANING UNIT AND METHOD

RELATED APPLICATION

The present application is a divisional application of, and claims priority under 35 U.S.C. §120 from, U.S. patent application Ser. No. 11/077,867 to Dennis P. Parazak et al., filed Mar. 10, 2005 and entitled, "Inkjet Wiping Fluid," which parent application is hereby incorporated by reference in its entirety.

BACKGROUND

Inkjet printing mechanisms may be used in a variety of different products, such as plotters, facsimile machines and inkjet printers, to print images using a colorant, referred to generally herein as "ink." These inkjet printing mechanisms use inkjet cartridges, often called "pens," to selectively emit drops of ink onto a page or sheet of print media. Some inkjet print mechanisms carry an ink cartridge, having a supply of ink back and forth across the sheet. Other inkjet print mechanisms, known as "off-axis" systems, propel only a small ink supply with the printhead carriage across the printzone, and store the main ink supply in a stationary reservoir, which is located "off-axis" from the path of printhead travel.

Each pen has a printhead that includes an orifice plate having a number of very small nozzles formed thereon through which ink drops are fired. Traditionally, repeated firing of ink from the nozzles of an orifice plate results in puddling of the ink on the orifice plate. The puddling of inks on the orifice plate of inkjet pens can be an issue for not only general orifice plate cleanliness, but also for the directionality and dot placement on the ink receiving medium since the puddles interfere with ejection of the drops from the nozzles. Problems caused by puddling include drop mis-directionality, massive ink accumulation on the nozzle (orifice) plate, pen service difficulties, and increased ink contact/attack to internal electrical components of the pen.

Typically, ink flow channel design and firing chamber architecture are designed to modulate puddling. Under-damped fluidic architectures enable higher firing frequencies which increase printer throughput, but can lead to increased puddling. Damped fluidic architecture can control puddling by the reduction of ink refill speed. However, damped fluidic architecture may have a negative effect on firing frequency response and ultimately on printer throughput speed. Additionally, damped fluidic architecture is also more susceptible to starvation and camber angle variation from nozzle to nozzle.

Another traditional approach for reducing ink puddling is to increase the viscosity of the ink. This could be realized by adding a high molecular weight surfactant/oligomer/polymer. Using viscous cosolvent or increasing the total organic content can also raise ink viscosity. However, image quality, defined by ink/media interaction, will not be optimized due to the formulation restriction for puddling control and increased ink viscosity generally decreases maximum firing frequency.

BRIEF DESCRIPTION OF THE DRAWINGS

The accompanying drawings illustrate various embodiments of the present method and system and are a part of the specification. The illustrated embodiments are merely examples of the present system and method and do not limit the scope thereof.

Throughout the drawing, identical reference numbers designate similar, but not necessarily identical, elements.

DETAILED DESCRIPTION

A method, apparatus, and composition for producing non-wetting behavior between an ink vehicle and an orifice plate/layer are described herein. More specifically, a non-wetting material such as fluorosurfactants or fluoropolymers are added to the inkjet pen servicing fluid, which is then wiped on a printhead, improving the puddling behavior and therefore the drop placement of the resulting printed material.

Before particular embodiments of the present system and method are disclosed and described, it is to be understood that the present system and method are not limited to the particular process and materials disclosed herein as such may vary to some degree. It is also to be understood that the terminology used herein is used for the purpose of describing particular embodiments only and is not intended to be limiting, as the scope of the present system and method will be defined by the appended claims and equivalents thereof.

In the present specification, and in the appended claims, the following terminology will be used:

The singular forms "a," "an," and "the" include plural referents unless the context clearly dictates otherwise. Thus, for example, reference to "an ink" includes reference to one or more of such materials.

The term "about" or "approximately" when referring to a numerical value or range is intended to encompass the values resulting from experimental error that can occur when taking measurements.

As used herein, "liquid vehicle" is defined to include liquid compositions that can be used to carry colorants, including pigments, to a substrate. Liquid vehicles are well known in the art, and a wide variety of liquid vehicle components may be used in accordance with various embodiments of the principles described herein. Such liquid vehicles may include a mixture of a variety of different agents, including without limitation, surfactants, co-solvents, buffers, biocides, viscosity modifiers, sequestering agents, stabilizing agents, and water. Though not liquid per se, the liquid vehicle can also carry other solids, such as polymers, UV curable materials, plasticizers, salts, etc.

As used herein, "pigment" refers to a colorant particle which is typically substantially insoluble in the liquid vehicle in which it is used.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

As used in this specification and in the appended claims, the term "ink" is meant to be understood broadly as any jettable fluid, with or without colorant that may be selectively ejected by any number of inkjet printing devices. Additionally, the term "jettable" is meant to be understood as a fluid that has a viscosity suitable for precise ejection from an inkjet printing device. Moreover, the term "print medium" or "print media" is meant to be understood broadly as any substrate or material configured to receive an ink from a printing device including, but in no way limited to, a paper based medium, a plastic based medium such as a transparency, or a cloth based medium. Further, the term "non-wettable material" is meant to be understood as including any material that causes non-wetting behavior between an ink vehicle and an orifice plate/layer of an inkjet pen including, but in no way limited to, fluorosurfactants and fluoropolymers.

In the following description, for purposes of explanation, numerous specific details are set forth in order to provide a thorough understanding of the present system and method for adding a non-wetting material to an inkjet pen servicing fluid to improve the puddling behavior of a treated inkjet pen. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
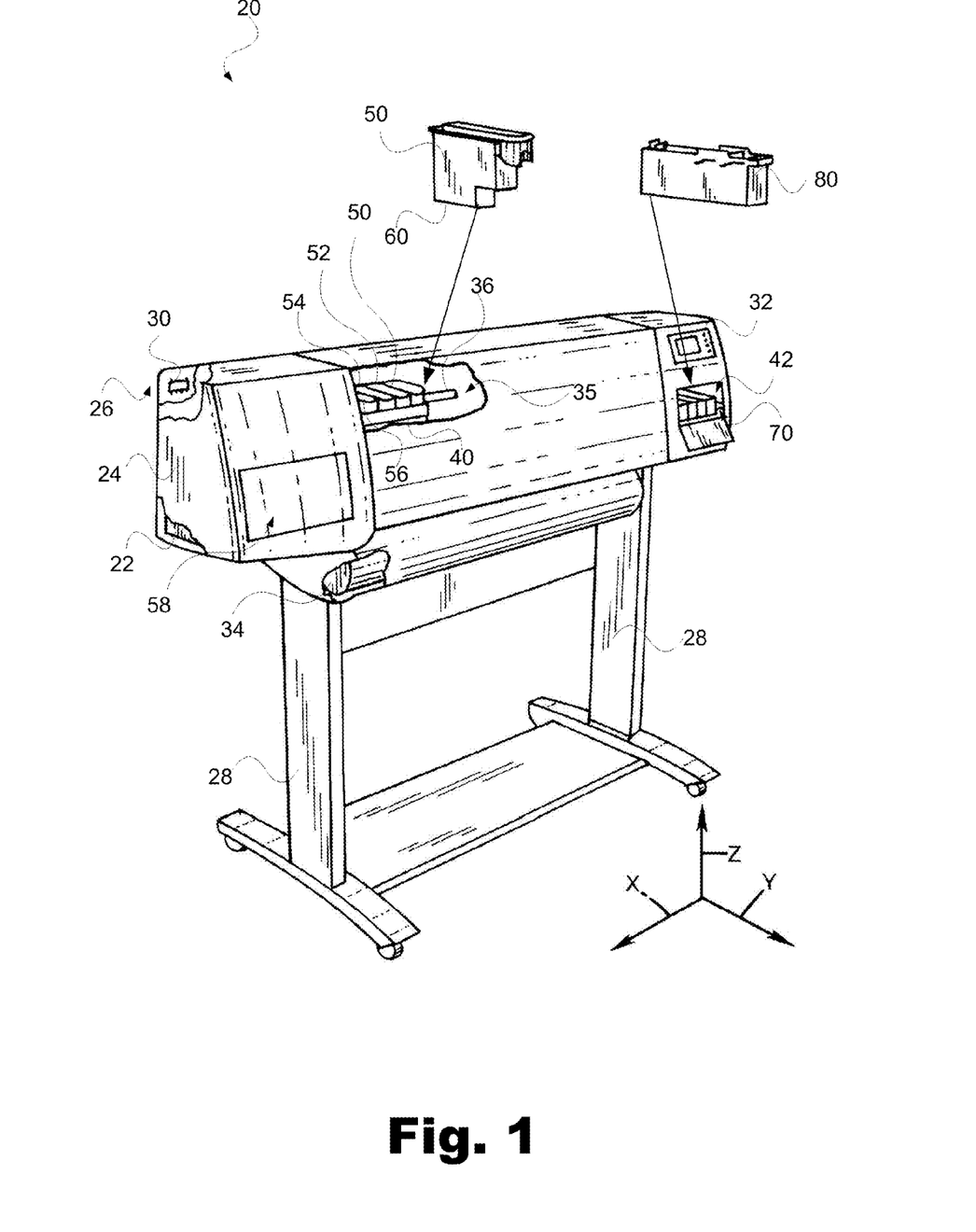
FIG. 1 is a perspective view of one form of an inkjet printing mechanism, here an inkjet plotter, according to one exemplary embodiment.

FIG. 1 illustrates an exemplary inkjet printing mechanism, here shown as an inkjet plotter (20) that may incorporate the present exemplary system and method. According to one exemplary embodiment, the exemplary inkjet plotter (20) illustrated in FIG. 1 may be used for printing conventional engineering and architectural drawings, as well as high quality poster-sized images, and the like, in an industrial, office, home, or other environment. A variety of inkjet printing mechanisms may embody the present system and method including, but in no way limited to, desk top printers, portable printing units, copiers, cameras, video printers, facsimile machines, and the like. For convenience only, the present system and method will be described below in the context of an inkjet plotter (20).

While the plotter components may vary from model to model, according to one exemplary embodiment, the inkjet plotter (20) includes a chassis (22) surrounded by a housing or casing enclosure (24), typically of a plastic material, together forming a print assembly portion (26) of the plotter (20). While the print assembly portion (26) of the inkjet plotter (20) may be supported by any supportive structure such as a desk or tabletop, the exemplary plotter (20) illustrated in FIG. 1 is shown being supported by a pair of leg assemblies (28). Additionally, the plotter (20) includes a plotter controller, illustrated schematically as a microprocessor (30), configured to receive instructions from a host device, typically a computer, such as a personal computer or a computer aided drafting (CAD) computer system (not shown). Alternatively, the plotter controller (30) may also operate in response to user inputs provided through a key pad and status display portion (32), located on the exterior of the casing (24). A monitor coupled to the computer host may also be used to display visual information to an operator, such as the plotter status or a particular program being run on the host computer.

A conventional print media handling system (not shown) may be used to advance a number of single sheets or a single continuous sheet of print media (34) through a print zone (35). The print media may be any type of suitable sheet material, such as paper, poster board, fabric, transparencies, mylar, and the like. However, for convenience, the illustrated embodiment is described using paper as the print medium. A carriage guide rod (36) is mounted to the chassis (22) to define a scanning axis (38), with the guide rod (36) slideably supporting an inkjet carriage (40) for travel back and forth, reciprocally, across the print zone (35). A conventional carriage drive motor (not shown) may be used to propel the carriage (40) in response to a control signal received from the controller (30). To provide carriage positional feedback information to the controller (30), a conventional metallic encoder strip (not shown) may be extended along the length of the print zone (35) and over the servicing region (42). A conventional optical encoder reader may be mounted on the back surface of printhead carriage (40) to read positional information provided by the encoder strip. The manner of providing positional feedback information via the encoder strip reader, may also be accomplished in a variety of ways known to those skilled in the art. Upon completion of printing an image, the carriage (40) may be used to drag a cutting mechanism (not shown) across the final trailing portion of the media to sever the image from the remainder of the roll (34).

Figure 2:
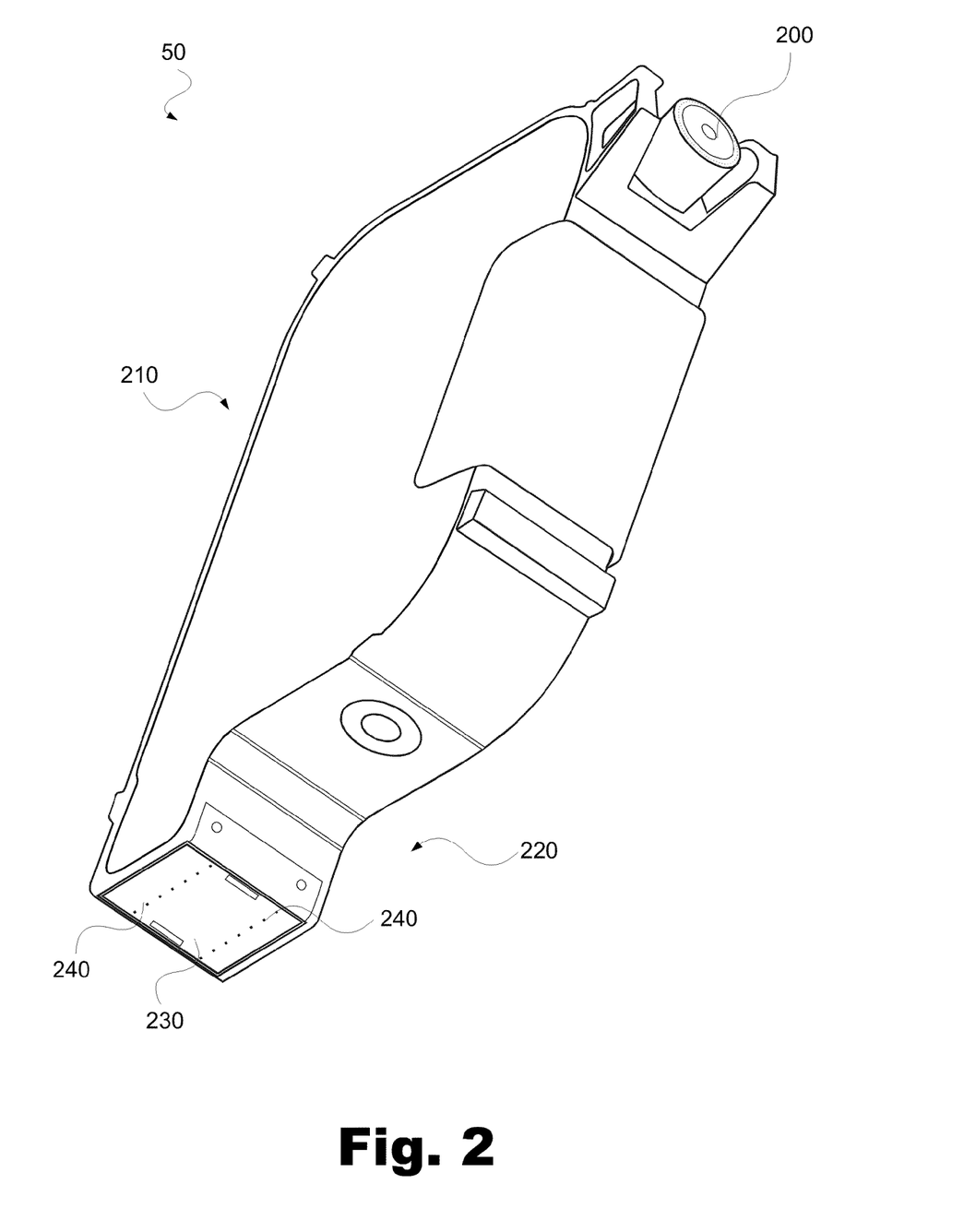
FIG. 2 is a perspective view of an inkjet pen, according to one exemplary embodiment.

In the printzone (35), the media sheet receives ink from an inkjet cartridge, such as a black ink cartridge or pen (50) and three monochrome color ink cartridges or pens (52, 54, 56). An exemplary inkjet cartridge or pen is described in greater detail below with reference to FIG. 2. As illustrated in FIG. 2, the black ink pen (50) is illustrated herein as containing pigment-based ink. For the purposes of illustration, the color pens (52, 54, 56) are described as each containing a dye-based ink of the colors yellow, magenta and cyan, respectively, although it is apparent that the color pens may also contain pigment-based inks, paraffin-based inks, as well as hybrid composite inks having both dye and pigment characteristics. According to one exemplary embodiment, the illustrated plotter (20; FIG. 1) uses an "off-axis" ink delivery system, having main stationary reservoirs (not shown) for each ink (black, cyan, magenta, yellow) located in an ink supply region (58). As used herein, the term "pen" or "cartridge" may also refer to replaceable printhead cartridges where each pen has a reservoir that carries the entire ink supply as the printhead reciprocates over the printzone.

As shown in FIG. 2 the exemplary ink pen (50) includes a body portion (210) and a printhead portion (220). The body portion (210) of the exemplary ink pen (50) carries the ink supply in a self contained inkjet pen, or allows for the transfer of ink to the printhead (220) portion in an off-axis ink delivery system.

The printhead (220) portion of the exemplary ink pen (50) is configured to selectively eject ink to form an image on a sheet of media (34) in the printzone (35). As illustrated in FIG. 2, the printhead (220) includes an orifice plate (230) having a number of nozzles (240) formed therein. The nozzles (240) of each printhead (220) are typically formed in at least one, but typically two approximately linear arrays along the orifice plate (230). The inkjet pen (50) forms a print swath determined by the size and orientation of the nozzles (240). According to one exemplary embodiment, the print swath is approximately 20 to 25 millimeters (about one inch) wide or wider, although the present exemplary system and method may also be applied to smaller or larger inkjet printheads.

According to one exemplary embodiment, the illustrated ink pen (50) is a thermal inkjet printhead, although other types of printheads may be used in conjunction with the present system and method, including, but in no way limited to, thermally actuated inkjet dispensers, mechanically actuated inkjet dispensers, electrostatically actuated inkjet dispensers, magnetically actuated dispensers, piezo-electrically actuated inkjet dispensers, continuous inkjet dispensers, etc. The thermal printhead (50) illustrated in FIG. 2 may include a plurality of resistors (not shown) which are associated with the nozzles (240). Upon energizing a selected resistor, a bubble of gas is formed which ejects a droplet of ink from the nozzle (240) and onto a sheet of print media disposed in the printzone (35) under the nozzle. The printhead resistors are selectively energized in response to firing command control signals delivered from the controller (30) to the printhead carriage (40). As mentioned previously, after repeated operation, ink may begin to puddle on the orifice plate (230), thereby causing a number of problems with the precision of the inkjet dispensing.

Figure 3:
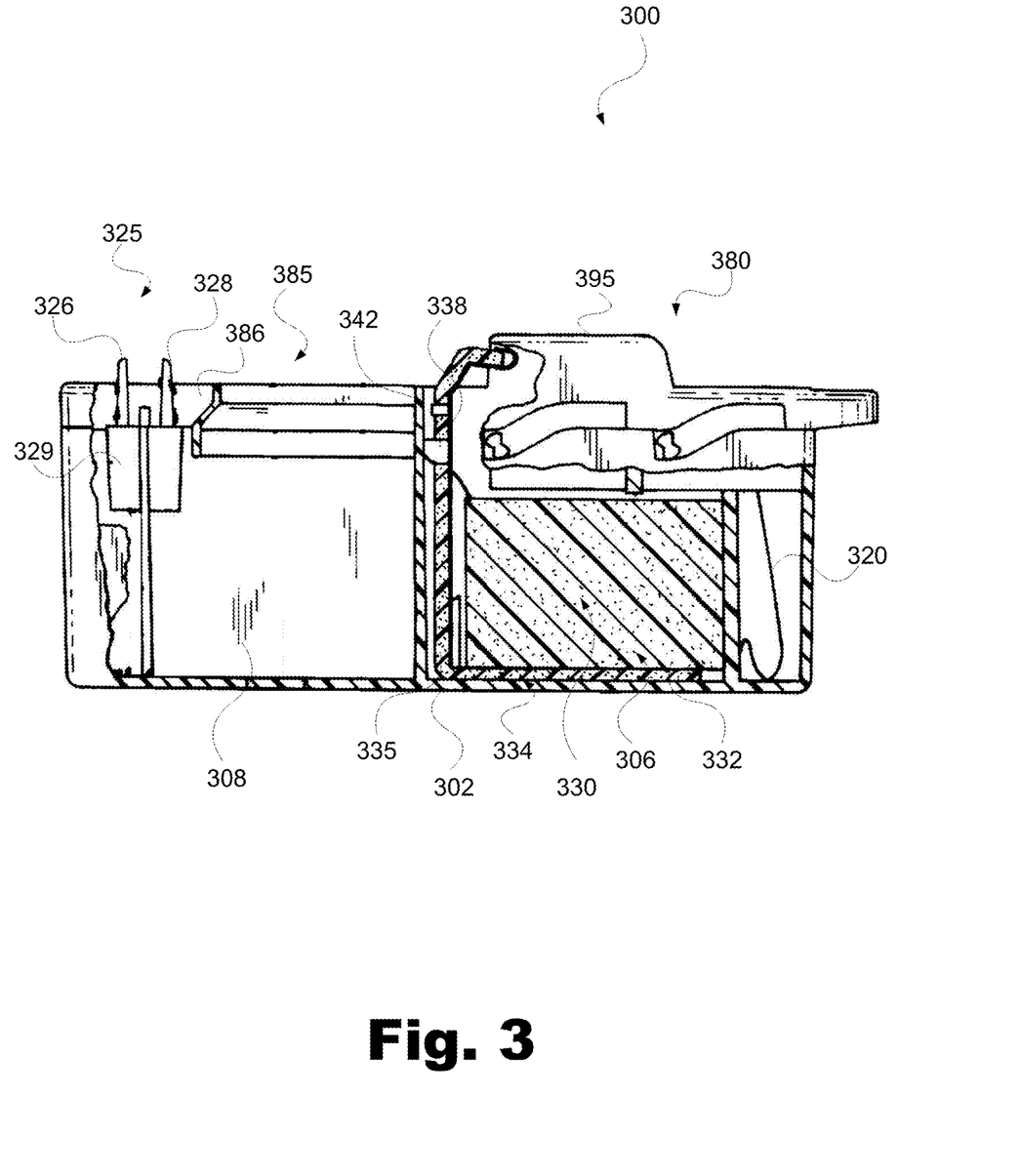
FIG. 3 is a cross-sectional side view illustrating a printhead cleaner unit of a service station system, according to one exemplary embodiment.

FIG. 3 illustrates an exemplary cleaner unit assembly (300), configured to clean the printhead (220) of an ink pen (50). Beginning near the bottom of the figure, and working upward, the exemplary cleaner unit (300) includes a base (302), which may include a series of mounting tabs or datums unique for each cleaner unit, with mating slots being supplied on the inkjet plotter (20; FIG. 1). The base (302) defines two reservoir chambers, including an ink solvent chamber (306) and a spittoon chamber (308).

For the color cleaner units the spittoon (308) is filled with an ink absorber (not shown), preferably of a foam material, although a variety of other absorbing materials may also be used. The ink absorber receives ink spit from the color printheads, and then hold the ink while the volatiles or liquid components evaporate, leaving the solid components of the ink trapped within the chambers of the foam material. The spittoon (308) of the black cleaner unit (300) is supplied as an empty chamber, which then fills with tar-like black ink residue that is removed from the printhead (220; FIG. 2) over the life of the cleaner unit.

FIG. 3 also illustrates a dual bladed wiper assembly (325) that includes two wiper blades (326) and (328), which are preferably constructed with rounded exterior wiping edges and an angular interior wiping edge. The wiper assembly (325) includes a base portion (329) which resiliently grips one wall of the spittoon chamber (308). According to one exemplary embodiment, each of the wiper assemblies (325) is constructed of a flexible, resilient, non-abrasive, elastomeric material, such as nitrile rubber, or more preferably, ethylene polypropylene diene monomer (EPDM), or other comparable materials known in the art.

As illustrated in FIG. 3, the ink solvent chamber (306) houses an ink solvent (330), which may be held within a porous solvent reservoir body or block (332) installed within the ink solvent chamber (306). According to one exemplary embodiment, the reservoir block (332) is made of a porous material, such as an open-cell thermoset plastic in the form of a polyurethane foam, a sintered polyethylene, or other functionally similar material known in the art. According to the present system and method, the inkjet ink solvent (330) either includes or is made entirely of a non-wetting material, as will be discussed in further detail below.

To deliver the solvent (330) from the reservoir (332), the cleaner unit (300) includes a solvent applicator or distribution member (334), which includes an applicator wick (335). A number of wick tabs (342) and springs (338) hold the applicator wick (335) in place within the solvent chamber (306) leading to the top portion of the cleaner unit (300).

The exemplary cleaner unit (300) also includes a cover (380). The cover (380) defines a spittoon opening or mouth 185, through which ink spit is delivered to the interior of the open spittoon (308). The cover (380) also defines a wiper opening (386), through which extends the wiper assembly (325). The exemplary cleaner assembly (300) also includes a solvent applicator hood (395), which shields the extreme end of the solvent applicator wick (335) when assembled.

Exemplary Operation

Figure 4:
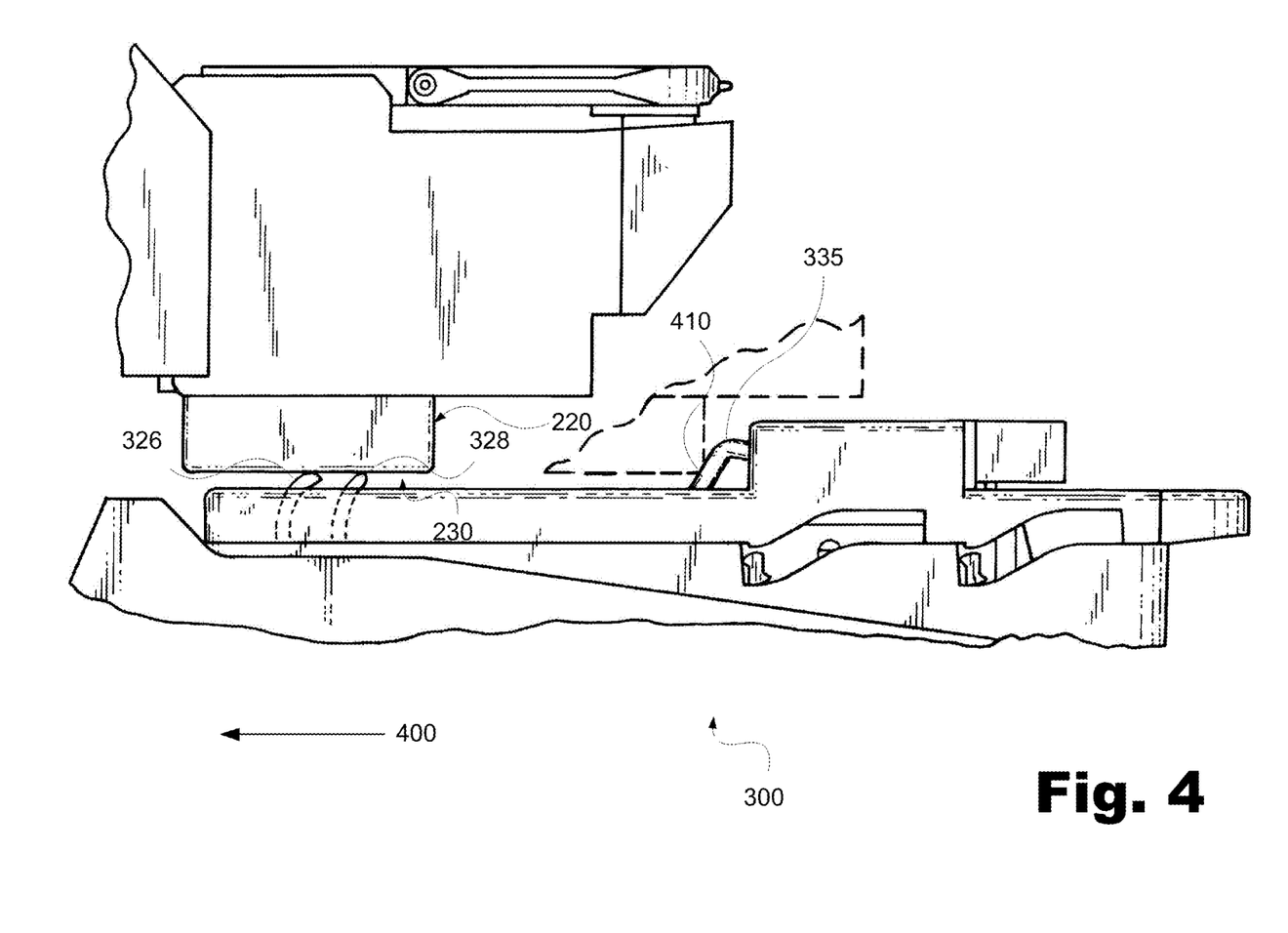
FIG. 4 is a side elevation view illustrating the wiping of a printhead and the subsequent application of a fluid assisted wiping additive, according to one exemplary embodiment.

FIG. 4 illustrates a wiping stroke, here with the wipers (326, 328) of the exemplary cleaner unit (300) shown wiping the printhead (220). During this stroke, the cleaner unit (300) is moving in the rearward direction (400), so the rounded exterior wiping edge of a first wiper blade (326) first contacts the printhead (220), followed by the angular interior wiping edge of the second blade (328). According to one exemplary embodiment the rounded wiping edge of the first blade (328) wicks or draws ink from the nozzles through capillary action, which acts as a solvent and lubricant during the wiping stroke, followed by the angular wiping edge of the second blade (328), which serves to remove any wicked ink and dissolved ink residue remaining on the printhead (220).

FIG. 4 also illustrates application of the ink solvent (330; FIG. 3) to a front edge (410) of the printhead (220). According to one exemplary embodiment, the ink solvent (330; FIG. 3) is applied to the printhead (220) via the passing of the printhead over the wick (335) containing ink solvent (330; FIG. 3) made of or containing a non-wetting material. Alternatively, the present ink solvent including a non-wetting material may be applied to one or more of the wipers (326, 328) which then applies the solvent to the printhead.

According to one exemplary embodiment, the solvent reservoir block (332; FIG. 3) is acted upon by a spring (320; FIG. 3) or other biasing agent to cause approximately 0.5 mg (milligrams) of solvent (330; FIG. 3) to be applied to the printhead (220) per application. The solvent (330) may dissolve ink residue on the surface of the printhead (220), act as a lubricant during the wiping strokes, and reduce or eliminate the likelihood of ink puddling on the orifice plate (230).

According to one exemplary embodiment, the leading edge (410) of the printhead (220) contacts the wick applicator (335), as shown in dashed lines in FIG. 4. Once the wick applicator (335) is contacted by the leading edge of the printhead (220), fluid (330) is dispensed as the applicator wick (335) is compressed by the printhead. When the applicator wick (335) is compressed, the solvent (330) is pushed out of the wick (335) and onto the printhead leading edge (410).

Once the solvent (330) is pushed out of the wick (335), it is then distributed over the orifice plate (230) by the wipers (326, 328) during a subsequent wiping stroke. Thus, each successive dispensing of the ink solvent (330) adds to an existing quantity of solvent already resident on the printhead (220) and wipers (326, 328) from previous applications.

Furthermore, the present ink solvent (330) at least partially includes non-wettable materials such as fluorosurfactants or fluoropolymers. Consequently, the present ink solvent (330) also acts to control ink puddling on the orifice plate (230). The application of these non-wetting materials via fluid assisted wiping is a much simpler and less expensive process than modifying the orifice plate/layer by incorporating non-wetting materials into the printhead itself.

Exemplary Composition

Traditionally, fluorosurfactants have been incorporated in the formulation of inkjet inks to reduce puddling. The inclusion of fluorosurfactants serve to reduce dry time and increase media throughput, as is taught in U.S. Pat. No. 6,436,180 to Ma, Zeying et al., which is incorporated herein by reference in its entirety. The above-mentioned puddling on the printhead surface (220; FIG. 2) is a large concern for ink jet printing. Issues caused by puddling of ink on the printhead surface include drop mis-directionality, massive ink accumulation on the orifice plate (230; FIG. 2), pen service difficulties, and increased ink contact/attack to the cover layer of flex circuit from outside in.

By applying non-wetting materials, i.e. fluorosurfactants or fluoropolymers, to the orifice plate (230; FIG. 2) via fluid assisted wiping during inkjet pen servicing, as mentioned above, ink puddling is reduced without adding the fluorinated material directly to the inkjet ink.

In accordance with the present system and method, any number of non-wetting materials, i.e. fluorosurfactants, fluoropolymers, and the like, are included in the ink solvent (330; FIG. 3) to reduce puddling of the inkjet ink when applied to the nozzle plate via wiping in servicing events. Examples of suitable fluorosurfactants include, but are in no way limited to, the ZONYL series, available from E.I. Du Pont de Nemours Company, and the FLUORAD, NOVEC and Fluorinert series, available from the 3M Company. The ZONYL fluorosurfactants include, but are in no way limited to: $(R_FCH_2CH_2O)_xPO(O^-NH_4^+)_y$, where $x+y=3$ and $R_F=F(CF_2CF_2)_{2-8}$ (FSP); FSP+hydrocarbon surfactant (FSJ); $R_FCH_2CH_2SO_3H$, $R_FCH_2CH_2SO_3^-NH_4^+$ (TBS); $C_6F_{13}CH_2CH_2SO_3H$, $C_6F_{13}CH_2CH_2SO_3^-NH_4^+$ (FS-62); $R_FCH_2CH_2SCH_2CH_2COO^-Li^+$ (FSA); $R_FCH_2CH_2O(CH_2CH_2O)_wH$ (FSH), $R_FCH_2CH_2O(CH_2CH_2O)_xH$ (FSO), $R_FCH_2CH_2O(CH_2CH_2O)_zH$ (FS-300) and $R_FCH_2CH_2O(CH_2CH_2O)_yH$ (FSN) where $w<x<y<z$. The moiety $R_F$ is $F(CF_2CF_2)_2$, where $z=1-7$ (FSP, FSJ, FSO) or $1-9$ (TBS, FSA). The FLUORAD fluorosurfactants include, but are in no way limited to, ammonium perfluoroalkyl sulfonates (FC-120), potassium fluorinated alkyl carboxylates (FC-129), fluorinated alkyl polyoxyethylene ethanols (FC-170C), fluorinated alkyl alkoxylate (FC-171), and fluorinated alkyl ethers (FC-430, FC-431, FC-740). The Novec fluorosurfactants include various derivatives of perfluorobutane and perfluorobutane sulfonate.

The fluorosurfactants or fluoropolymers may either be dissolved in a solvent or may be the fluid themselves. Examples of wiping fluids that may act as a solvent for the fluorosurfactant or fluoropolymer are, but not limited to water, glycerol, ethylene glycol, propylene glycol, polyethylene glycols or polypropylene glycols of various molecular weight; oxyalkylated alcohols, fatty acids or other hydrocarbon acids or alcohols; oxyalkylated polyols such as glycerol; polyether polyols such as Dantocol and Multranol. Mixtures of the above are also useful.

Due to the effectiveness of the fluorosurfactants or fluoropolymers in the wiping fluid on puddling control, ink formulation freedom is expanded. Surfactants or solvents used in ink vehicles that are poor in puddling performance can be reconsidered and, indeed, can be used in combination with these materials. As a result of incorporating the above-mentioned non-wetting materials into the ink solvent (330; FIG. 3), the pen orifice plate (230; FIG. 2) is cleaner, resulting in better drop directionality, better serviceability, and reduced cross-contamination between colors sharing the same orifice plate.

Non-wetting materials, i.e. fluorinated surfactants or fluorinated polymers that are typically not soluble in typical inkjet ink vehicles or cause reliability problems may be used to improve the puddling behavior according to the present system and method because they are not required to be formulated into the inkjet inks. Rather, the non-wetting materials are applied to the orifice plate by fluid assisted wiping. According to the present system and method, the fluorinated material is either soluble in the wiping fluid or acts as the wiping fluid itself. The effectiveness of the present system and method will be illustrated by the examples below.

The following examples illustrate exemplary embodiments of the present system and method. However, it is to be understood that the following is only exemplary or illustrative of the application of the principles of the present system and method. Numerous modifications and alternative compositions, methods, and systems may be devised by those skilled in the art without departing from the spirit and scope of the present system and method. The appended claims are intended to cover such modifications and arrangements. Thus, while the present system and method has been described above with particularity, the following examples provide further detail in connection with what is presently deemed to be the most practical and preferred embodiments of the present system and method.

EXAMPLE 1

According to a first example, a yellow ink that is known to exhibit problems with excessive puddling in thermal ink-jet pens was selected to test the effectiveness of the above-mentioned ink solvent formulations. The formula for the selected yellow ink is shown below in Table 1.

TABLE 1

| Example 1 Ink Formula (all values are in %) | |
|---|---|
| Cyclic Lactam | 4.00 |
| Alkyldiol | 9.00 |
| Hydroxyalkyl Modified Cyclic Lactam | 9.00 |
| Acetylenic Alcohol Based Surfactant | 0.16 |
| Dowfax 2A1 | 0.32 |
| Proxel GXL | 0.10 |
| EDTA | 0.10 |
| Organic Acid | 5.50 |
| Yellow Dye with max absorbance at 393 nm | 3.72 |
| Yellow Dye with max absorbance at 402 nm | 0.48 |
| Deionized Water | Balance |
| pH adjusted to 4.0 with NaOH | |

The ink formulation illustrated in Table 1 was loaded into a thermal inkjet pen. The ink formulation was then fired from the thermal inkjet pen at a number of frequencies and examined between 1 and 48 kHz using a high speed camera connected to a microscope with a synchronized strobe so that the ejection characteristics of individual drops could be observed.

The present example was performed using three different fluorosurfactants: DuPont's Zonyl surfactants FS-62, FS-300 and FSO. The general chemical structures of the three fluorosurfactants are shown in Table 2 below. As shown in Table 2, two of the fluorosurfactants are nonionic and one is anionic. Additionally, the surfactant could be cationic rather than nonionic or anionic, as long as the surfactant is either soluble in the wiping fluid or makes up the entire wiping fluid. The pen wiping fluids of the present example were prepared by dissolving the fluorosurfactants into poly(ethylene glycol), molecular weight 300 (PEG300), a typical wiping fluid. While the fluorosurfactant may constitute between approximately 0.001% and 100% of the wiping fluid, according to the present example, the fluorosurfactants were dissolved at a concentration of approximately 5%. Additionally, a pure wiping fluid of PEG300 was used as a control.

TABLE 2

Flourosurfactants

| Zonyl | Formula | Ionic Type |
|---|---|---|
| FS-62 | $C_6F_{13}CH_2CH_2SO_3H + C_6F_{13}CH_2CH_2SO_3^-NH_4^+$ | Anionic |
| FSO | $R_fCH_2CH_2O(CH_2CH_2O)_xH$ | Nonionic |
| FS-300 | $R_fCH_2CH_2O(CH_2CH_2O)_yH$ | Nonionic |

$R_f = CF_3CF_2(CF_2CF_2)_N$ where n = 2-4 x < y

The present example examined the puddling behavior of the above-mentioned ink on an inkjet printhead after three different wiping conditions: one with no fluid assisted wipe, with the orifice wiped with PEG300 only, and wiped with the PEG300+one of three fluorosurfactant solutions. The wiping was accomplished by applying the assistance fluids with a texwipe. The puddling behavior of the ink/pen was then examined at three different firing frequencies.

Upon examination, a dramatic difference in puddling behavior was seen. All three of the solutions including the surfactants in the PEG300 reduced or eliminated the puddling in the ink/orifice interaction. Further, the PEG300 alone wipe showed similar puddling behavior as the unwiped control, indicating that the contribution of the PEG300 to the puddling control is minimal or nil, attributing the reduction in puddling behavior to the inclusion of the surfactant in the fluid assisted wipe.

Figure 5:
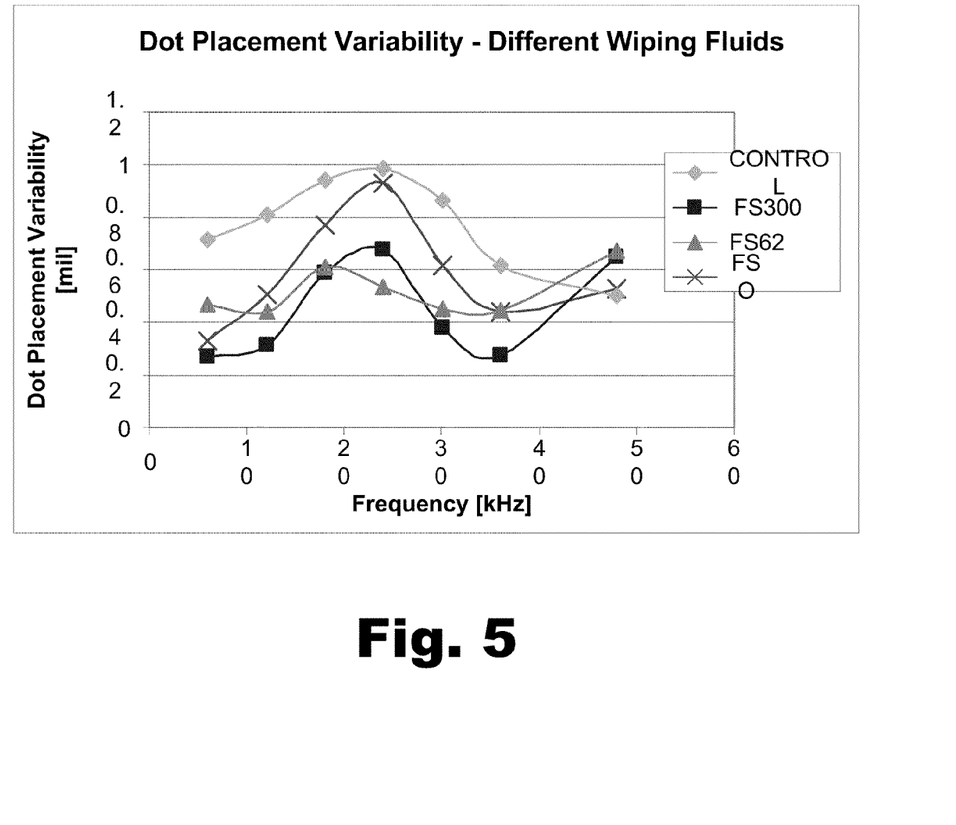
FIG. 5 is a chart illustrating the results of a directionality analysis using various wiping fluids, according to one exemplary embodiment.
Figure 6:
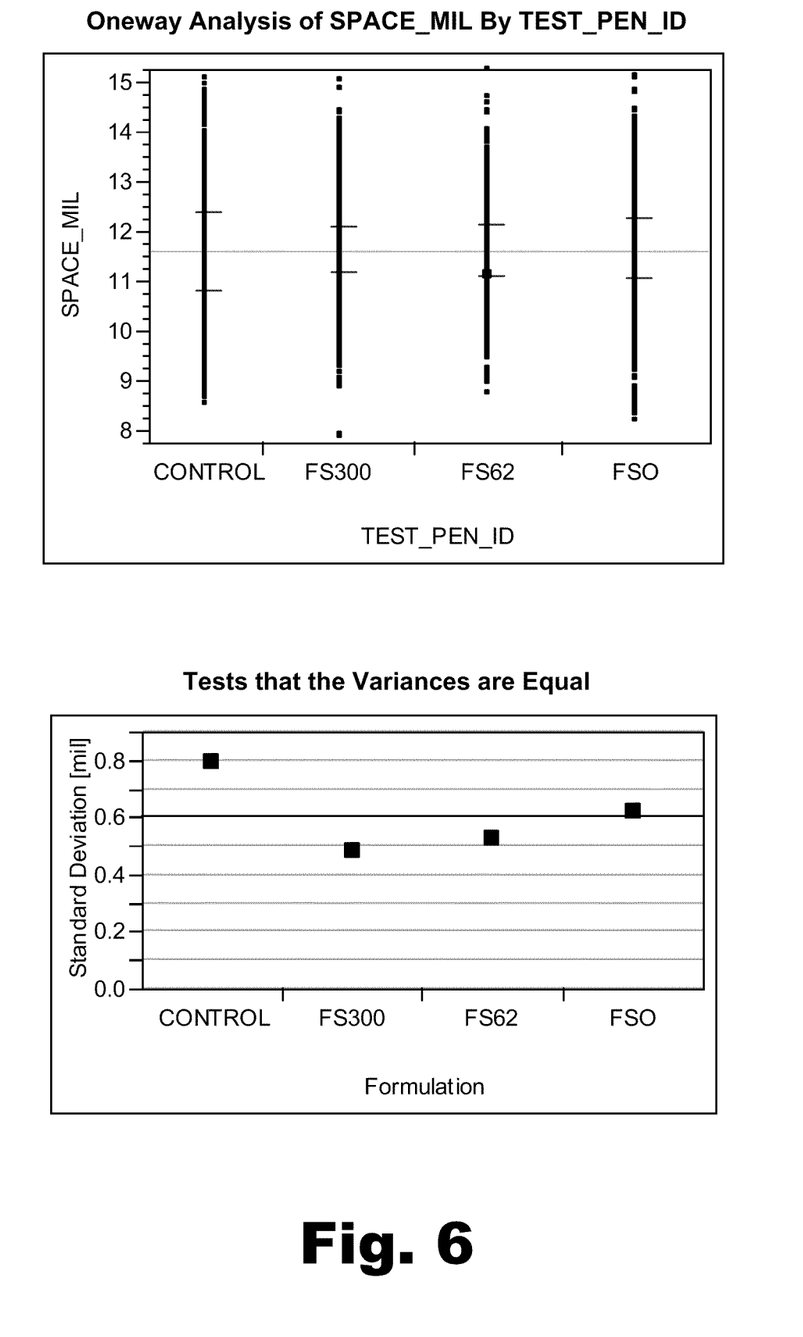
FIG. 6 is a statistical analysis illustrating the accuracy of the directionality analysis, according to one exemplary embodiment.

In addition to visually inspecting the level of ink puddling at the various firing frequencies, ink droplet directionality was also measured by printing diagnostic plots with the various pens and grading the diagnostic plots with computer vision inspection tools. Diagnostic plots enable precise measurement of the actual locations the droplets land on the print media and compare them to theoretically ideal locations. This difference is often called directionality error or simply directionality, and can be quantified in terms of distance or angular trajectory error. The results of the directionality measurements are shown in FIG. 5 and the statistical analysis is shown in FIG. 6. As illustrated in FIGS. 5 and 6, the results of the vision inspection grading show generally improved performance in paper axis directionality (PAD) variability with the wiping treatments that include the non-wetting materials. Essentially, droplets more often went where they were supposed to with the non-wetting material treatment than with the control pens, due, at least in part, to a change in the character of the ink puddling.

EXAMPLE 2

According to a second example, 18 thermal inkjet pens having a target drop rate of 6 ng were filled with an ink that is known to exhibit puddling behavior on the selected inkjet pens. The formulation of the ink is shown below in Table 3. As illustrated in Table 3, the ink used in the second example was the same ink formula used in Example 1, substituting cyan dyes for the yellow dyes to increase dot visibility. The pens printed frequency scans on a test bed. Six pens were printed with a PEG300 wipe (hereinafter referred to as the PEG wipe), six with an FS 300 wipe (PEG300 containing 5% active Zonyl FS-300—a nonionic fluorosurfactant) and six with a water wipe only. The deionized water, the PEG wipe, and the FS 300 formulation were all wiped on the orifice plate of the pens via a Texwipe soaked with the fluid. The plots were then graded with a machine visual inspection system for PAD (paper axis directionality) error as a function of frequency.

TABLE 3

| Example 2 Ink Formula (all values are in %) | |
|---|---|
| Cyclic Lactam | 4.00 |
| Alkyldiol | 9.00 |
| Hydroxyalkyl Modified Cyclic Lactam | 9.00 |
| Acetylenic Alcohol Based Surfactant | 0.16 |
| Dowfax 2A1 | 0.32 |
| Proxel GXL | 0.10 |
| EDTA | 0.10 |
| Organic Acid | 5.50 |
| Cyan Dye with max absorbance at 609 nm | 4.41 |
| Cyan Dye with max absorbance at 630 nm | 0.39 |
| Deionized Water | Balance |
| pH adjusted to 4.0 with NaOH | |

Results of the above-mentioned example were obtained at various print frequencies represented by frequency diagnostic plots. The results shown in FIG. 7 across the entire frequency range accessible with current thermal inkjet technology suggest an improvement in line spacing variability. More specifically, the pens being wiped with the FS 300 wipe exhibited a lower pad error at all frequencies when compared to the PEG wipe and the de-ionized water wipe. Additionally, as illustrated in FIG. 8, the low frequency dot placement error diagnostics suggest similar or slightly improved performance with the FS 300 wipe as well.

Figure 7:
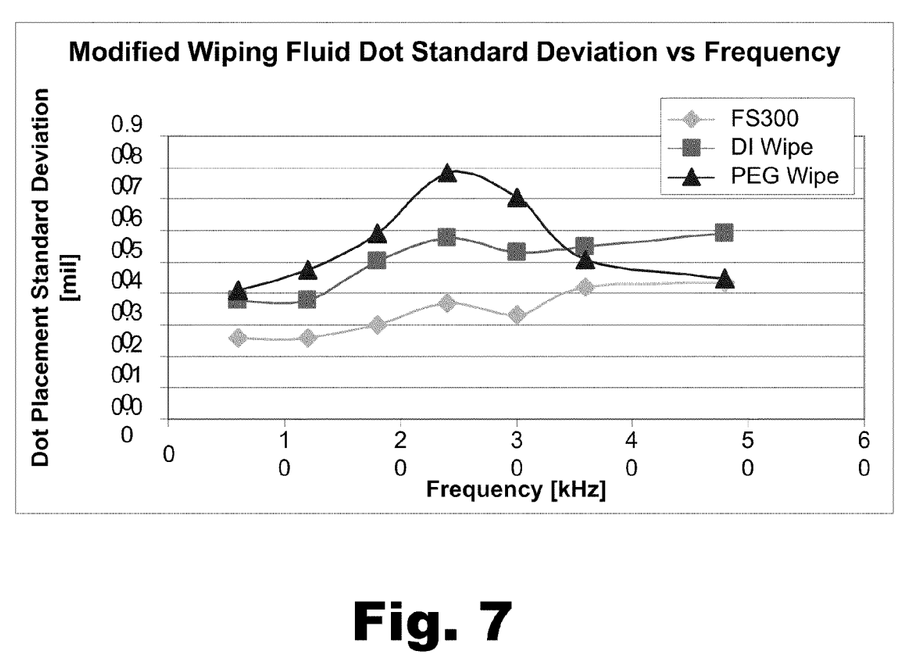
FIG. 7 is a chart illustrating the results of a visual inspection of the printing by various inkjet pens, according to one exemplary embodiment.
Figure 8:
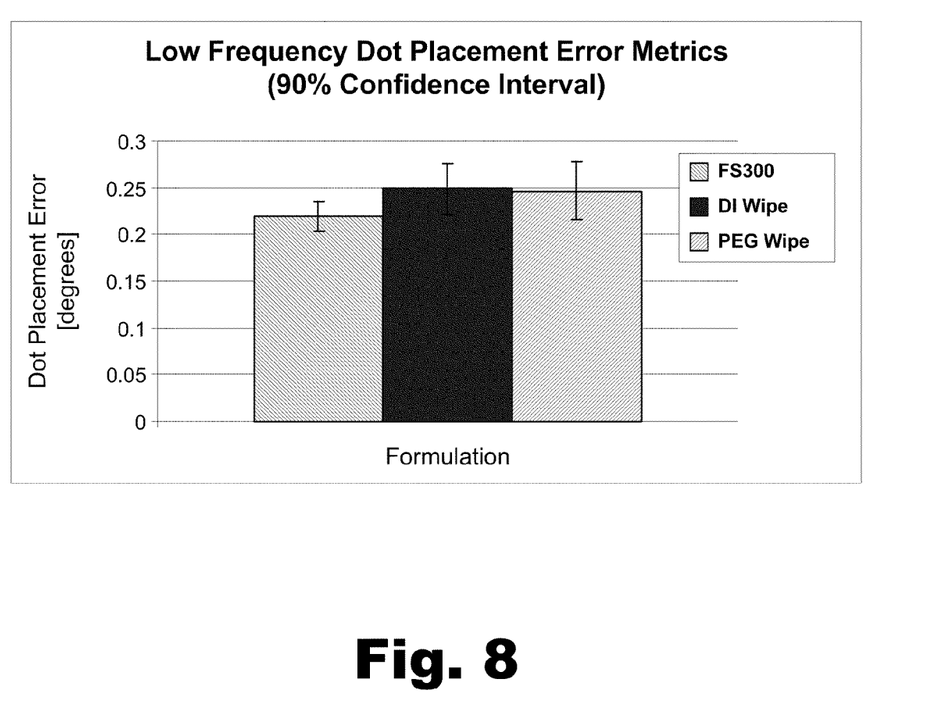
FIG. 8 is a bar graph illustrating the low frequency dot placement error diagnostics of various inkjet pens, according to one exemplary embodiment.
Figure 9:
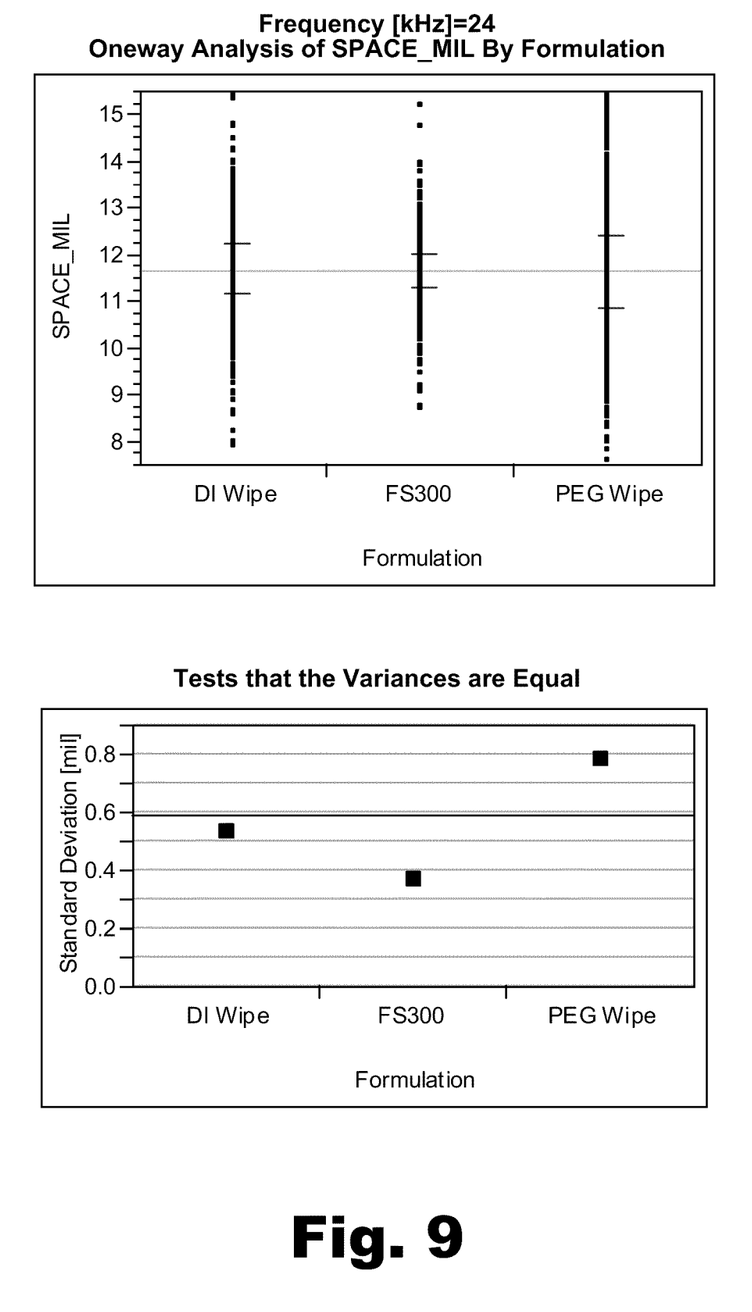
FIG. 9 shows the probability results taken at firing frequency of 24 kHz.
Figure 10:
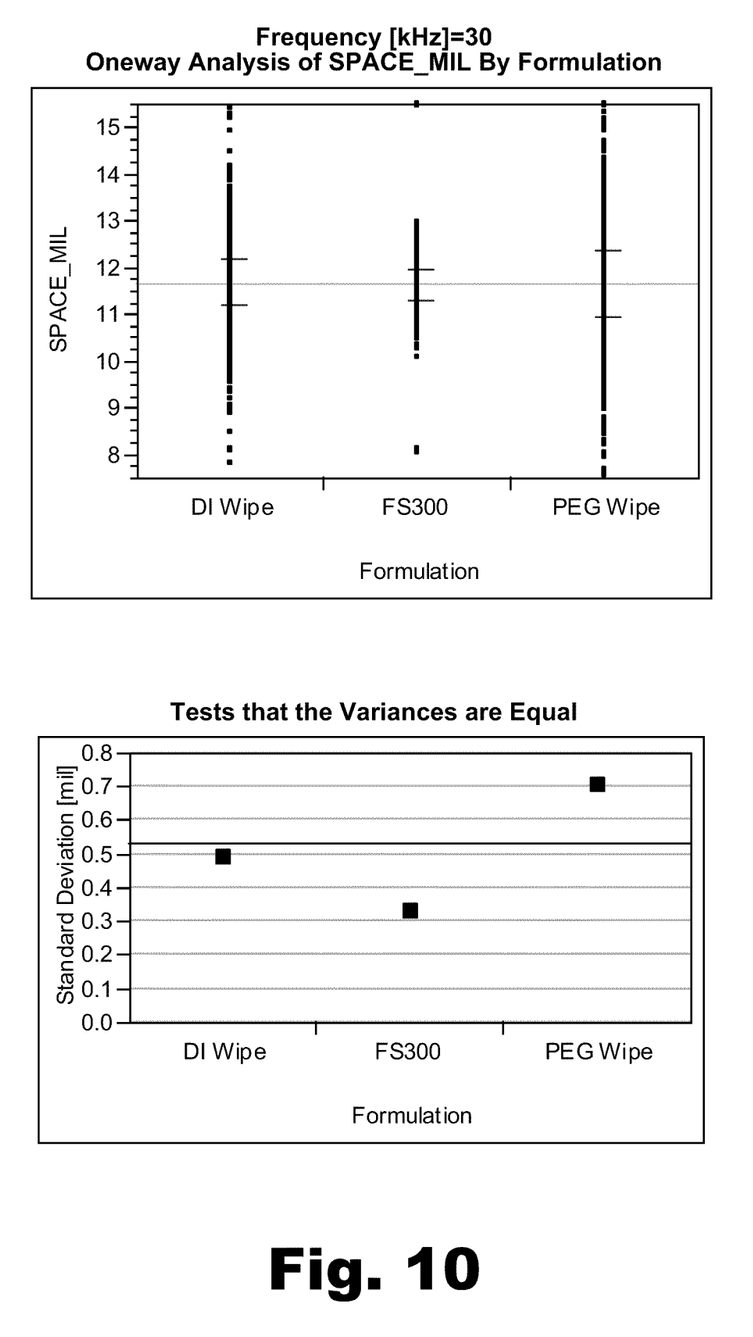
FIG. 10 shows the probability results taken at firing frequency of 30 kHz.
Figure 11:
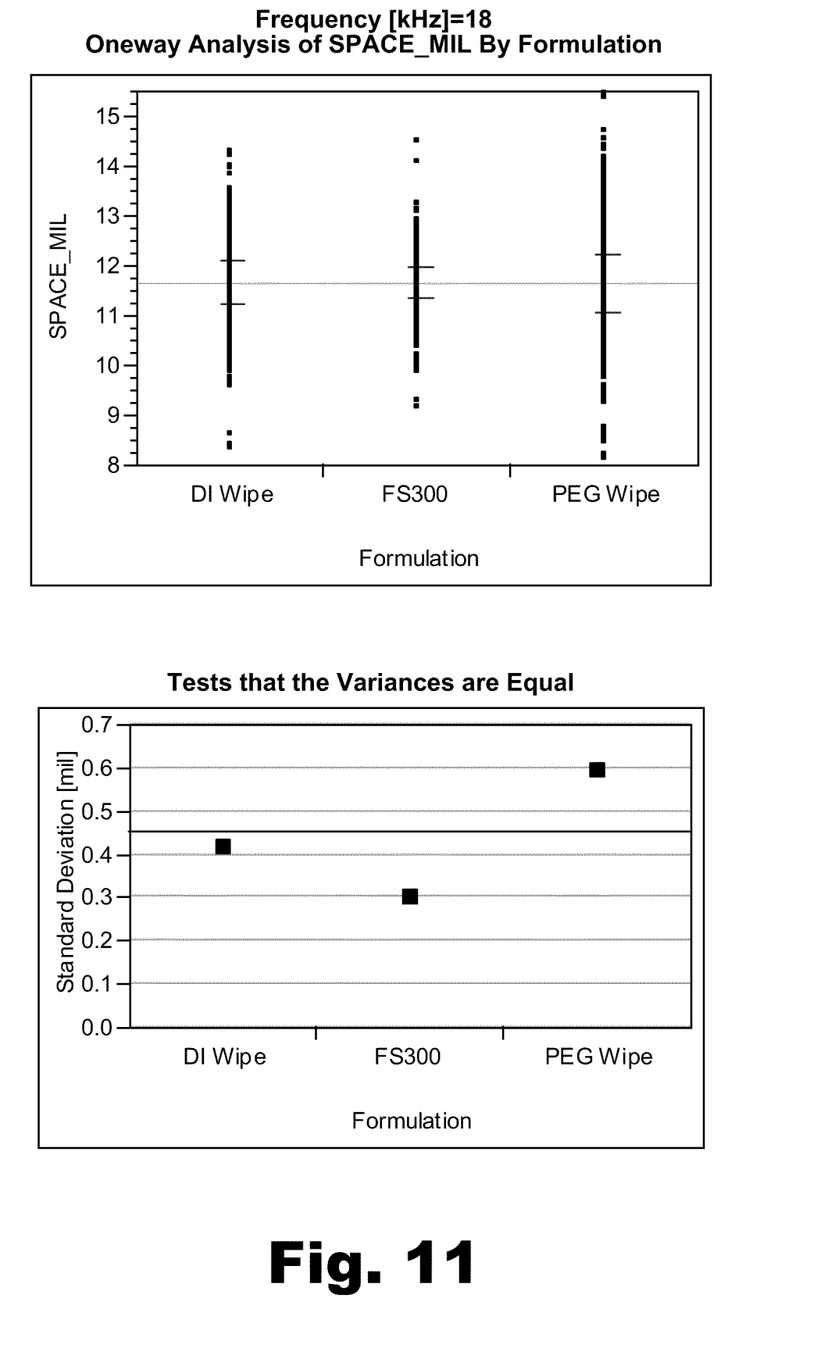
FIG. 11 shows the probability results taken at firing frequency of 18 kHz.

In order to build statistical confidence in the results shown in FIGS. 7 and 8, tests were performed on the data using a test of equal variance. FIGS. 9-11 show the probability results taken at firing frequencies of 24, 30, and 18 kHz respectively. As illustrated in FIGS. 9-11, the variances of the result distributions are equal as a very low number. In fact, the variances of the result distributions are equal at less than 0.0001, which suggests that the differences observed between the control and test populations were statistically relevant. Consequently, the results of Examples 1 and 2 above suggest that the present exemplary wiping solutions containing not-wetting materials such as fluorosurfactants contribute to a meaningful difference in directionality performance.

In conclusion, the present system and method includes adding a non-wetting material to an inkjet pen servicing fluid to improve the puddling behavior of treated inkjet pens. More specifically, the inclusion of non-wetting material, such as fluorosurfactants or fluoropolymers, to an inkjet pen servicing fluid reduces the amount of puddling that occurs on treated orifice plates while improving the drop placement of the resulting printed material.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. An inkjet cleaning unit comprising:
a reservoir housing an inkjet wiping fluid that comprises a quantity of a non-wettable, fluorated material; and
an applicator fluidly coupled to said reservoir, in which said applicator is configured to transport said inkjet wiping fluid from said reservoir to a surface of an inkjet material dispenser,
wherein said inkjet cleaning unit coats said non-wettable material over said surface of said inkjet material dispenser such that said non-wettable material is effective to reduce puddling of ink on said surface of said inkjet material dispenser;
in which said inkjet wiping fluid consists entirely of said non-wettable material.

2. The inkjet cleaning unit of claim 1, in which said wiping fluid has a vapor pressure of less than 1 mbar at 25° C.

3. The inkjet cleaning unit of claim 1, in which said inkjet wiping fluid comprises a solvent that comprises at least one of one of glycerol, ethylene glycol, propylene glycol, polyethylene glycol, polypropylene glycol, oxyalkylated alcohol, fatty acid, hydrocarbon acid, hydrocarbon alcohol, oxyalkylated polyol, or polyether polyol.

4. The inkjet cleaning unit of claim 3, in which said inkjet wiping fluid comprises polyethylene glycol with a molecular weight of approximately 300.

5. The inkjet cleaning unit of claim 1, in which said non-wettable material comprises one of a fluorosurfactant or a fluoropolymer.

6. The inkjet cleaning unit of claim 5, in which said fluorosurfactant comprises one of a $(R_FCH_2CH_2O)_xPO(O^-NH_4^+)_y$, where $x+y=3$ and $R_F=F(CF_2CF_2)_{2-8}$ (FSP); FSP+hydrocarbon surfactant (FSJ), $R_FCH_2CH_2SO_3H$, $R_FCH_2CH_2SO_3^-NH_4^+$ (TBS); $C_6F_{13}CH_2CH_2SO_3H$, $C_6F_{13}CH_2CH_2SO_3^-NH_4^+$ (FS-62); $R_FCH_2CH_2SCH_2CH_2COO^-Li^+$ (FSA); $R_FCH_2CH_2O(CH_2CH_2O)_wH$ (FSH), $R_FCH_2CH_2O(CH_2CH_2O)_xH$ (FSO), $R_FCH_2CH_2O(CH_2CH_2O)_zH$ (FS-300) or $R_FCH_2CH_2O(CH_2CH_2O)_yH$ (FSN) where $w<x<y<z$, where the moiety $R_F$ is $F(CF_2CF_2)_2$, and where $z=1$-$7$ (FSP, FSJ, FSO) or 1-9 (TBS, FSA).

7. The inkjet cleaning unit of claim 5, in which said fluorosurfactant comprises one of an ammonium perfluoroalkyl sulfonate, a potassium fluorinated alkyl carboxylate, a fluorinated alkyl polyoxyethylene ethanol, a fluorinated alkyl alkoxylate, a fluorinated alkyl ether, a perfluorbutane or a perfluorobutane sulfonate.

8. The inkjet cleaning unit of claim 1, in which said non-wettable material comprises approximately 5% by volume of said inkjet wiping fluid.

9. A method for cleaning an inkjet material dispenser comprising:
applying an inkjet wiping fluid from a reservoir housing said inkjet wiping fluid to a surface of said inkjet material dispenser;
wherein said inkjet wiping fluid comprises a non-wettable material; and
wherein applying said inkjet wiping fluid comprises disposing said non-wettable, material on said surface of said inkjet material dispenser such that said non-wettable material on said surface of said inkjet material dispenser is then effective to reduce puddling of ink on said surface of said inkjet material dispenser;
in which said inkjet wiping fluid consists entirely of said non-wettable material.

10. The method of claim 9, in which said wiping fluid has a vapor pressure of less than 1 mbar at 25° C.

11. The method of claim 9, in which said inkjet wiping fluid comprises a solvent that comprises at least one of one of glycerol, ethylene glycol, propylene glycol, polyethylene glycol, polypropylene glycol, oxyalkylated alcohol, fatty acid, hydrocarbon acid, hydrocarbon alcohol, oxyalkylated polyol, or polyether polyol.

12. The method of claim 11, in which said inkjet wiping fluid comprises polyethylene glycol with a molecular weight of approximately 300.

13. The method of claim 9, in which said non-wettable material comprises one of a fluorosurfactant or a fluoropolymer.

14. The method of claim 13, in which said fluorosurfactant comprises one of a $(R_FCH_2CH_2O)_xPO(O^-NH_4^+)_y$, where $x+y=3$ and $R_F=F(CF_2CF_2)_{2-8}$ (FSP); FSP+hydrocarbon surfactant (FSJ), $R_FCH_2CH_2SO_3H$, $R_FCH_2CH_2SO_3^-NH_4^+$ (TBS); $C_6F_{13}CH_2CH_2SO_3H$, $C_6F_{13}CH_2CH_2SO_3^-NH_4^+$ (FS-62); $R_FCH_2CH_2SCH_2CH_2COO^-Li^+$ (FSA); $R_FCH_2CH_2O(CH_2CH_2O)_wH$ (FSH), $R_FCH_2CH_2O(CH_2CH_2O)_xH$ (FSO), $R_FCH_2CH_2O(CH_2CH_2O)_zH$ (FS-300) or $R_FCH_2CH_2O(CH_2CH_2O)_yH$ (FSN) where $w<x<y<z$, where the moiety $R_F$ is $F(CF_2CF_2)_2$, and where $z=1$-$7$ (FSP, FSJ, FSO) or 1-9 (TBS, FSA).

15. The method of claim 13, in which said fluorosurfactant comprises one of an ammonium perfluoroalkyl sulfonate, a potassium fluorinated alkyl carboxylate, a fluorinated alkyl polyoxyethylene ethanol, a fluorinated alkyl alkoxylate, a fluorinated alkyl ether, a perfluorbutane or a perfluorobutane sulfonate.

16. The method of claim 9, in which said non-wettable material comprises approximately 5% by volume of said inkjet wiping fluid.

* * * * *

UNITED STATES PATENT AND TRADEMARK OFFICE
CERTIFICATE OF CORRECTION

PATENT NO. : 9,016,830 B2
APPLICATION NO. : 12/548326
DATED : April 28, 2015
INVENTOR(S) : Dennis P. Parazak et al.

It is certified that error appears in the above-identified patent and that said Letters Patent is hereby corrected as shown below:

In the claims

In column 11, line 53, in Claim 7, delete "perfluorbutane" and insert -- perfluorobutane --, therefor.

In column 12, line 49, in Claim 15, delete "perfluorbutane" and insert -- perfluorobutane --, therefor.

Signed and Sealed this
First Day of December, 2015

Michelle K. Lee
*Director of the United States Patent and Trademark Office*